(12) United States Patent
Yoshida et al.

(10) Patent No.: US 7,115,213 B2
(45) Date of Patent: Oct. 3, 2006

(54) FERROMAGNETIC ZNO-TYPE COMPOUND INCLUDING TRANSITION METALLIC ELEMENT AND METHOD FOR ADJUSTING FERROMAGNETIC CHARACTERISTICS THEREOF

(75) Inventors: Hiroshi Yoshida, Kawanishi (JP); Kazunori Sato, Minoh (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/984,837

(22) Filed: Nov. 10, 2004

(65) Prior Publication Data
US 2005/0095445 A1 May 5, 2005

Related U.S. Application Data

(62) Division of application No. 09/696,013, filed on Oct. 26, 2000, now abandoned.

(30) Foreign Application Priority Data
Oct. 29, 1999 (JP) ................................ 11-308911

(51) Int. Cl.
*H01L 49/02* (2006.01)
(52) U.S. Cl. .............................. 252/62.51 R; 117/944; 428/702; 428/928
(58) Field of Classification Search .................... None
See application file for complete search history.

(56) References Cited

U.S. PATENT DOCUMENTS

| | | | |
|---|---|---|---|
| 3,933,538 A * | 1/1976 | Akai et al. ................ | 117/57 |
| 4,041,140 A | 8/1977 | Nitta et al. | |
| 4,495,793 A | 1/1985 | Hager | |
| 5,198,025 A | 3/1993 | Dausch | |
| 5,532,062 A | 7/1996 | Miyazaki et al. | |
| 5,800,824 A | 9/1998 | Pfrommer et al. | |
| 6,127,768 A | 10/2000 | Stoner et al. | |
| 6,291,085 B1 * | 9/2001 | White et al. ................ | 428/642 |
| 6,342,313 B1 * | 1/2002 | White et al. ................ | 428/701 |
| 6,448,585 B1 * | 9/2002 | Kadota ...................... | 257/103 |
| 6,498,362 B1 * | 12/2002 | Forbes et al. .............. | 257/295 |

FOREIGN PATENT DOCUMENTS

WO   WO 00/22202   4/2000

OTHER PUBLICATIONS

Sato et al, "Material Design for Transparent Ferromagnets with ZnO-Based Magnetic Semiconductors", Jpn. Appl. Phys. vol. 39 Part 2, No. 6B (2000), pp. L555-L558.*

Fukumura et al, "An oxide-diluted magnetic semiconductor: Mn-doped ZnO", Appl. Phys. Lett., vol. 75, No. 21, Nov. 1999, pp. 3366-3368.*

Chem Abstracts citation 1962: 58105, Pappalardo et al., "Optical Absorption of Ni-Doped Oxide Systems", Journ. Chem. Phys., V 35, 1961, pp. 1460-1478.

Minegishi et al., "Growth of P-Type Zinc Oxide Films by Chemical Vapor Deposition," Jpn. J. Appl. Phys. vol. 36, Part 2, No. 11A, Nov. 1997, pp. L1453-L1455.

* cited by examiner

*Primary Examiner*—C. Melissa Koslow
(74) *Attorney, Agent, or Firm*—Arent Fox PLLC

(57) ABSTRACT

The ZnO-type compound contains at least one metal selected from a group of transition elements consisting of V, Cr, Fe, Co, Ni, Rh and Ru. Ferromagnetic characteristics are adjusted by adjusting densities of these transition elements, by varying combinations of two or more types of metals including Mn, or by adding dopants. It is consequently possible to obtain a ferromagnetic ZnO-type compound exhibiting ferromagnetic characteristics by using a light-transmitting ZnO-type compound, and to obtain a ferromagnetic ZnO-type compound exhibiting desired ferromagnetic characteristics.

5 Claims, 4 Drawing Sheets

US 7,115,213 B2

FERROMAGNETIC ZNO-TYPE COMPOUND INCLUDING TRANSITION METALLIC ELEMENT AND METHOD FOR ADJUSTING FERROMAGNETIC CHARACTERISTICS THEREOF

This is a Division of application Ser. No. 09/696,013 filed Oct. 26, 2000, now abandoned. The disclosure of the prior application is hereby incorporated by reference herein in its entirety.

FIELD OF THE INVENTION

The present invention relates to a single crystal ferromagnetic ZnO-type compound realizing ferromagnetic characteristics by crystal-mixing at least one of transition elements such as V, Cr, Fe, Co, Ni, Rh or Ru to a light-transmitting ZnO-type compound and a method for adjusting ferromagnetic characteristics thereof. More particularly, it relates to a ferromagnetic ZnO-type compound exhibiting desired ferromagnetic characteristics, such as ferromagnetic transition temperature, and a method for adjusting the ferromagnetic characteristics thereof.

BACKGROUND OF THE INVENTION

If it is possible to obtain single crystal ferromagnetic thin films exhibiting high ferromagnetic characteristics while transmitting light, it will be possible to provide light isolators or to perform high-density magnetic memory as it is required in transmitting a large amount of information and thus to manufacture electronic materials required for transmission of large amount of information in the future. It is therefore being wanted for materials exhibiting ferromagnetic characteristics while transmitting light.

On the other hand, ZnO-type compounds are advantaged through their characteristics of exhibiting a large band gap of 3.3 eV and transmitting light of wavelengths ranging from blue to ultraviolet, and due to their large binding energy of their excitons when compared to, for instance, GaN, remarkable progresses are being expected in the field of manufacturing optical devices such as light quantum computers employing coherent spin states once it is possible to exhibit ferromagnetism through these materials. However, while there are conventionally known cases in which ZnO is doped using Mn, ZnO will be in an antiferromagnetic state and no cases have so far been reported in which ZnO-type compounds are in ferromagnetic conditions.

As noted, if it would be possible exhibit ferromagnetic characteristics by using ZnO-type compounds, quite a large variety of applications to devices utilizing magnetic-optical effects will be provided in which these compounds are used in combination with light-emitting elements such as semiconductor laser of ZnO-type compounds exhibiting large binding energy of excitons or in which light reflecting magnetic states are generated.

In case of arranging memories of ferromagnetic bodies by irradiating such light and varying magnetic states, it will be necessary to set ferromagnetic characteristics to be desired ones in which, for instance, a ferromagnetic transition temperature (Curie temperature) is set to be a temperature that is varied upon radiation of light (a temperature slightly higher than room temperature).

SUMMARY OF THE INVENTION

The invention has been made in view of these circumstances, and it is an object thereof to provide a ferromagnetic ZnO-type compound exhibiting ferromagnetic characteristics by using a light-transmitting ZnO-type compound.

It is another object of the present invention to provide a method for adjusting ferromagnetic characteristics of the ferromagnetic ZnO-type compound in obtaining the ferromagnetic ZnO-type compound which ferromagnetic characteristics such as ferromagnetic transition temperatures may be adjusted.

The inventors of the present invention have found upon performing various studies for obtaining a single crystal structure with ferromagnetic characteristics by using a ZnO-type compound that is a particularly suitable material transmitting light, that the ion radii of transition elements such as Ti, V, Cr, Mn, Fe, Co or Ni approximate to that of Zn and that single crystal structures may be sufficiently obtained even by substituting (crystal-mixing) more than 50% of Zn, that even though only antiferromagnetic characteristics may be obtained by crystal-mixing Mn to ZnO, ferromagnetic characteristics may be obtained adding holes or electrons (increasing or decreasing electrons) to the electron condition of Mn in this state (with 5 d-electrons), that similar effects as by adding holes to Mn may be achieved by crystal-mixing Cr or V, which number of d-electrons are less than those of Mn, to the ZnO-type compound, and that similar effects as by doping electrons to Mn may be achieved by crystal-mixing Fe, Co or Ni to the ZnO-type compound, and finally came to find out that by crystal-mixing at least one of transition elements such as V, Cr, Fe, Co, Ni, Rh or Ru to the ZnO-type compound, a stable ferromagnetic condition may be achieved by simply crystal-mixing these metallic elements.

By further continuing these studies, the inventors have found that transition elements such as Ti, V, Cr, Mn, Fe, Co or Ni assume high spin states with electron spins s of 5/2, 4/2, 3/2, 2/2 or 1/2, that ferromagnetic transition temperature is variable by varying their densities (concentration of added element(s) or amount of added element(s)), crystal-mixing by varying combinations or ratios of two or more types thereof or by adding n-type and/or p-type dopants, that the ferromagnetic state may be stabilized than compared to antiferromagnetic or paramagnetic states, that an energy in the ferromagnetic state (for instance, an energy with which the ferromagnetic state may be maintained in an ordinary condition though an antiferromagnetic state is assumed in the presence of slightest differences) is adjustable, and that desired filtering functions may be exhibited by selectively performing crystal-mixing of two or more types of the above transition metallic elements that exhibit different minimum transmission wavelengths, and finally came to find out that by adjusting densities or mixing ratios of these transition metallic elements, a single crystal and ferromagnetic ZnO-type compound exhibiting desired magnetic characteristics may be obtained.

The ferromagnetic ZnO-type compound according to the present invention is a ZnO-type compound containing at least one metal selected from a group of transition metallic elements consisting of V, Cr, Fe, Co, Ni, Rh and Ru.

It should be noted that the term "ZnO-type compound" here denotes an oxide including Zn, a concrete example of which is ZnO, respective oxides of a IIA group element with Zn, a IIB group element with Zn or IIA group element and IIB group element with Zn.

With this structure, with the above-listed transition metallic elements which iron radii approximate to those of II group elements such as Zn, single crystal structures of Wurtzite structure may be maintained even upon substituting not less than 50 at % of Zn, and will exhibit ferromagnetic characteristics with increased holes or electrons than compared to Mn while maintaining its transparency.

By containing at least two types of metals selected from a group consisting of the above metals, Ti, Mn and Cu, conditions of d-electrons of the metallic elements will be respectively different so that ferromagnetic characteristics will be varied in a more direct manner than achieved by doping holes or electrons so that ferromagnetic characteristics such as ferromagnetic transition temperatures may be adjusted.

By performing doping by using at least one of an n-type dopant and a p-type dopant, the dopant will enter a matrix of ZnO so that it will act on d-electrons close to the matrix of ZnO, though their effects will not be so much direct as it is the case with transition element, and holes or electrons are varied to enable adjustments of ferromagnetic characteristics.

According to the method for adjusting ferromagnetic characteristics of a ZnO-type compound, one of (1) to (3), (1) at least one metallic element selected from a group consisting of transition metallic elements of V, Cr, Fe, Co, Ni, Rh and Ru, (2) at least two metallic elements selected from a group consisting of the above transition metallic elements, Ti, Mn and Cu, and (3) either (1) or (2) and at least one of an n-type dopant and a p-type dopant is added to the ZnO-type compound for adjusting ferromagnetic characteristics by adjusting an amount of added element(s) of the above transition elements, Ti, Mn, Cu or n-type dopant or p-type dopant or by a combination of the added element(s).

Particularly, it is possible to adjust the ferromagnetic transition temperature to be a desired temperature by using at least one method of adjusting the density (the density of transition elements, metallic elements such as Mn and dopants), and varying combinations of metallic elements as listed in above (2); to stabilize the ferromagnetic state by adjusting the ferromagnetic energy by crystal-mixing at least two types of metallic elements as listed in above (2), so that the entire energy decreases by kinetic energy based on holes or electrons introduced by said crystal-mixing metallic elements themselves; and to further stabilize the ferromagnetic state by crystal-mixing at least two types of metallic elements as listed in above (2), so that a magnetic interaction between metallic atoms is controlled holes or electrons introduced by the metallic elements themselves.

It is further possible to obtain a ferromagnetic ZnO-type compound with desired light-filtering characteristics by crystal-mixing at least two types of metallic elements as listed in above (2), so that transmitting characteristics of light is controlled by holes or electrons introduced by said crystal-mixing metallic elements themselves.

DETAILED DESCRIPTION

The ferromagnetic ZnO-type compound and the method for adjusting its ferromagnetic characteristics according to the present invention will now be explained with reference to the drawings. The ferromagnetic ZnO-type compound according to the present invention is a ZnO-type compound containing at least one metal selected from a group consisting of transition metallic elements of V, Cr, Fe, Co, Ni, Rh and Ru.

Figure 2:
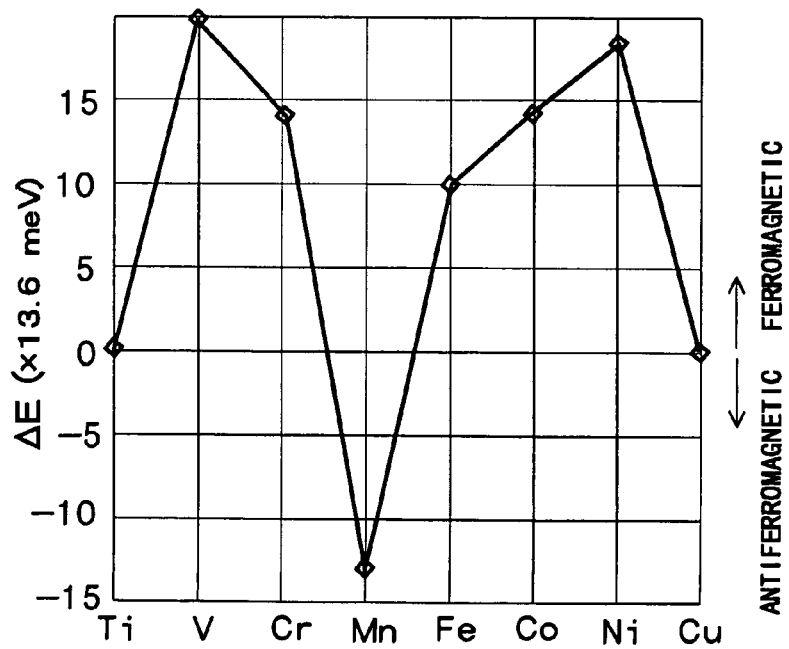
FIG. 2 is a diagram illustrating differences ΔE between entire energy of antiferromagnetic body and entire energy of ferromagnetic body when a transition element such as V, Cr is crystal-mixed to ZnO.

As already described, the inventors of the present invention have found out through various studies for obtaining a ferromagnetic material using a ZnO-type compound that in case of transition metallic elements V, Cr, Fe, Co, Ni, Rh and Ru, these transition metallic elements exhibit ferromagnetism by performing crystal-mixing of only these elements in a single manner due to the fact that 3d-electrons are increased/decreased through Mn, which itself is antiferromagnetic, as indicated by the difference ΔE between antiferromagnetic entire energy and ferromagnetic entire energy as illustrated in FIG. 2. While the ratio of mixed crystal to Zn in ZnO is 25 at % in this example, ferromagnetism can also be achieved already with a mixed crystal ratio of several %, causing no damages on crystallinity and transparency though this ratio be increased, and satisfactory ferromagnetism can be achieved with a ratio of 1 at % to 99 at %, preferably 10 at % to 80 at %. The transition metallic element may be used singly or, as it will be described later, by mixed crystal (alloying) more than two types thereof.

Figure 1:
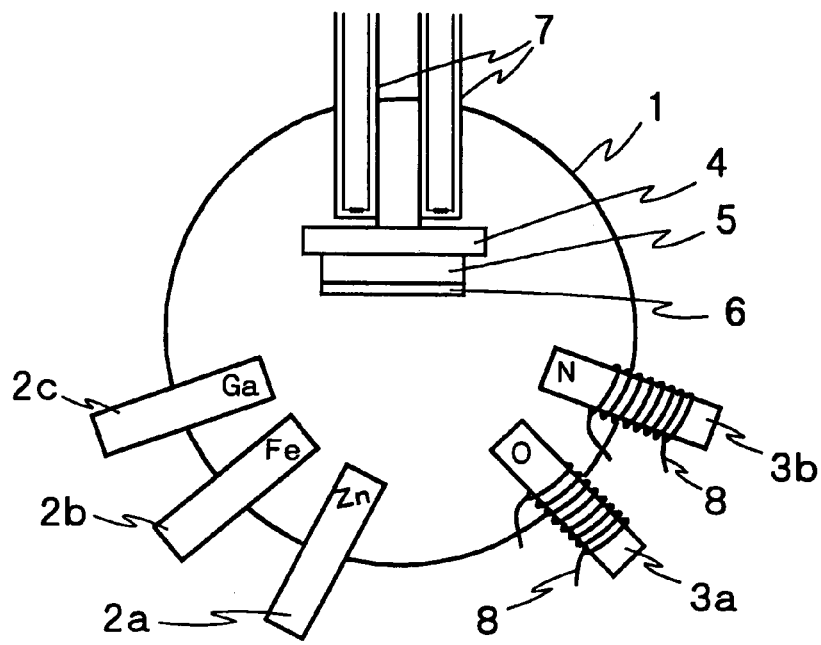
FIG. 1 is an explanatory view showing one example of a apparatus for forming a ferromagnetic ZnO-type compound thin film according to the present invention.

For forming a thin film using such a ZnO-type compound containing a transition metallic element, a substrate 5 that is made, for instance, of sapphire for growing a ZnO-type compound is disposed on a substrate holder 4 within a chamber 1 capable of maintaining an ultrahigh vacuum condition of approximately $1.33 \times 10^{-6}$ Pa, wherein the substrate 5 may be heated through a heater 7 as illustrated in a schematic explanatory view of a MBE apparatus of FIG. 1. A cell 2a containing therein an elemental material (source) Zn comprising the compound to grow, a cell 2b containing therein a transition metallic element such as Fe (though only one cell is illustrated, two or more cells are provided when crystal-mixing two or more types of metals), a cell 2c containing therein an n-type dopant such as Ga, Al or In, and RF radical cells 3a, 3b for generating radical oxygen O and radical nitrogen N are disposed to oppose the substrate 5 holded by the substrate holder 4. It should be noted that solid materials such as Zn or transition metallic elements might assume atomic states by putting oxides of these metals into the cells.

Though not illustrated, the cells 2a to 2c into which the solid bodies (elements) are put are respectively provided with heaters such that solid body sources are put into atomic states for evaporation through heating, and the radical cells 3a, 3b are activated by RF (radio frequency) coils 8 as shown in the drawing. As for the Zn, transition metallic elements and n-type dopant materials, a solid body source of a purity of 99.99999% is put into an atomic state while an atomic gas of 99.99999% in which $O_2$ is activated through the RF radical cells is used as O, and $N^+$ or $N_2$ in an excited state is used by activating $N_2$ molecules or $N_2O$ in the radical cells. It should be noted that Ga or transition mentallic elements might also be put in an atomic state by irradiating electromagnetic waves of microwave regions to molecular gas.

While making ZnO grow, Ga serving as an n-type dopant, an atomic N as a p-type dopant, and an atomic transition metallic element such as Fe are simultaneously poured onto the substrate 5 at a flow rate of $1.33 \times 10^{-5}$ Pa, a flow rate of $6.65 \times 10^{-5}$ Pa, and a flow rate of $1.33 \times 10^{-5}$ Pa, respectively, for growing at a temperature of 350 to 750° C. in order to grow a ZnO thin film 6 crystal-mixed with a transition metallic element. While doping is exemplarily performed using an n-type dopant or a p-type dopant in the above explanations, no dopants are used for the doping but doping is only performed using transition elements including Mn, Ti and Cu in the examples as illustrated in FIG. 2 as well as Tables 1 and 2 as will be described later.

The ZnO thin film in which V, Cr, Fe, Co and Ni are crystal-mixed exhibits ferromagnetism as shown in FIG. 2 in which V, Cr, Fe, Co and Ni respectively exhibit a difference $\Delta E$ between antiferromagnetic energy and ferromagnetic energy of $20 \times 13.6$ meV, $15 \times 13.6$ meV, $10 \times 13.6$ meV, $14 \times 13.6$ meV and $18 \times 13.6$ meV. It should be noted that the data of FIG. 2 are data obtained through first principle calculation in which simulation is performed using atomic numerals as input parameters.

While the ZnO compound is doped with a transition metallic element in this example, similar structures as ZnO may be obtained also with ZnO-type compounds in which apart of Zn of ZnO is substituted by other II-group elements such as Mg or Cd, and it is similarly possible to obtain a ferromagnetic single crystal structure.

According to the ferromagnetic ZnO-type compound of the present invention, a transition metallic element having ion radius that are substantially identical to that of Zn are crystal-mixed such that $Zn^{2+}$ is substituted by $Fe^{2+}$ or similar of the transition metallic element for maintaining the Wurtzite structure. Moreover, since the above transition metallic elements such as Fe assume electron structures in which d-electrons are increased than compared to Mn, the ferromagnetic state is stabilized as it is as illustrated in FIG. 2. Further, as illustrated in Tables 1 and 2 as will be described later, this ferromagnetic ZnO exhibits a large magnetic moment so that a Fe-containing ZnO-type compound having a larger magnetic moment $4.04 \times 9.274$ J/T ($4.04\mu_B$ (Bohr magneton)) than that of a Fe element (magnetic moment $2 \times 9.274$ J/T ($2\mu_B$)), and it is possible to obtain a ferromagnetic magnet with extremely strong magnetism.

Figure 3:
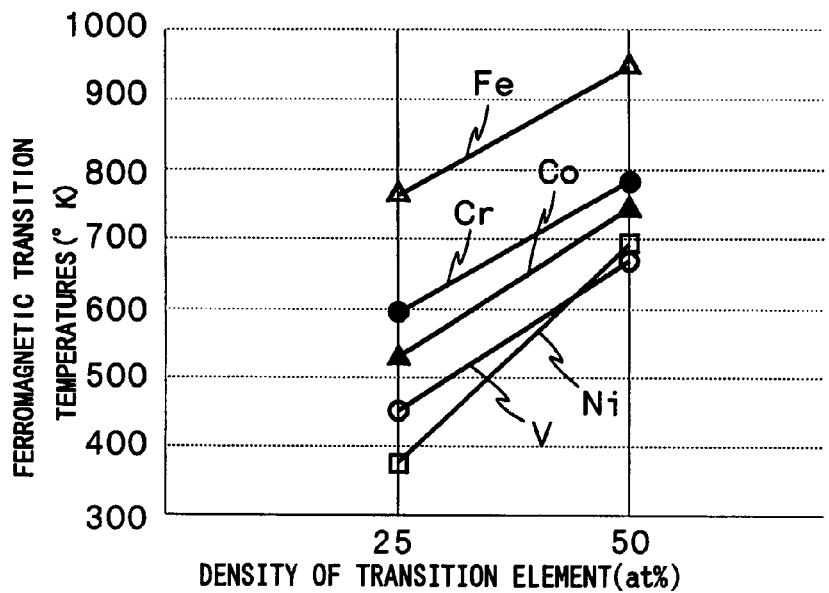
FIGS. 3(a) and 3(b) are diagrams illustrating variations in ferromagnetic transition temperatures and magnetic moments upon variations in density of transition element that is crystal-mixed to ZnO.
Figure 3:
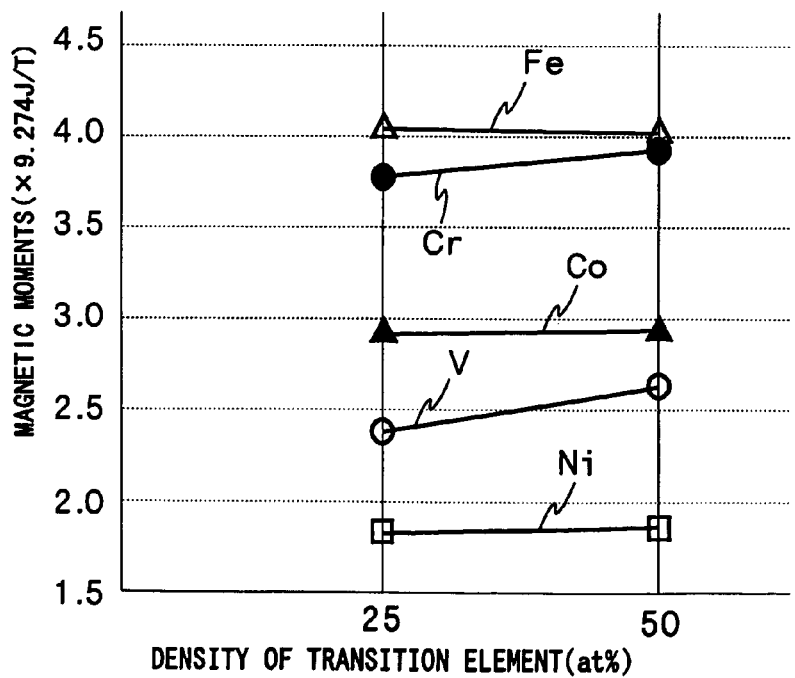

Variations in magnetic characteristics have then been tested by varying densities of transition metallic elements. In addition to the above examples in which transition metallic metals of a density of 25 at % are contained, those of a density of 50 at % were manufactured for testing respective magnetic moments ($\times 9.274$ J/T) and ferromagnetic transition temperatures (degree K). The magnetic moments and ferromagnetic transition temperatures have been obtained by measuring magnetizing rates using a SQUID (super conducting quantum interference device). The results are shown in Tables 1 and 2. It is obvious from Tables 1 and 2 that the ferromagnetic transition temperature tends to rise the higher the crystal-mixing ratio becomes (the higher the density becomes) and increases substantially proportional to the crystal-mixing ratio. This relationship is shown in FIG. 3. It can further be understood that the ferromagnetic interaction between spins is also increased in accordance with increased in densities of transition element lic elements and that the magnetic moments increase.

TABLE 1

Magnetic characteristics with transition elements of 25 at %

| Type of transition element | Density of transition element (at %) | Magnetic moment ($\mu_B$) | Ferromagnetic transition temperature (degree K) |
| --- | --- | --- | --- |
| V | 25 | 2.42 | 451 |
| Cr | 25 | 3.80 | 600 |
| Fe | 25 | 4.04 | 786 |
| Co | 25 | 2.96 | 528 |
| Ni | 25 | 1.88 | 389 |

TABLE 2

Magnetic characteristics with transition elements of 50 at %

| Type of transition element | Density of transition element (at %) | Magnetic moment ($\mu_B$) | Ferromagnetic transition temperature (degree K) |
| --- | --- | --- | --- |
| V | 50 | 2.58 | 681 |
| Cr | 50 | 3.95 | 792 |
| Fe | 50 | 4.02 | 959 |
| Co | 50 | 2.97 | 765 |
| Ni | 50 | 1.89 | 698 |

As already described, the transition metallic elements will assume high spin states with electron spins s of 5/2, 4/2, 3/2, 2/2, 1/2, and as it is further evident from the Tables 1 and 2 as well as FIGS. 3(a) and 3(b), it is possible to adjust and control the ferromagnetic interaction between spins and the ferromagnetic temperatures by varying the densities. It should be noted that it is preferable in view of practical use that the ferromagnetic transition temperature be not less than 150 degree K.

Figure 4:
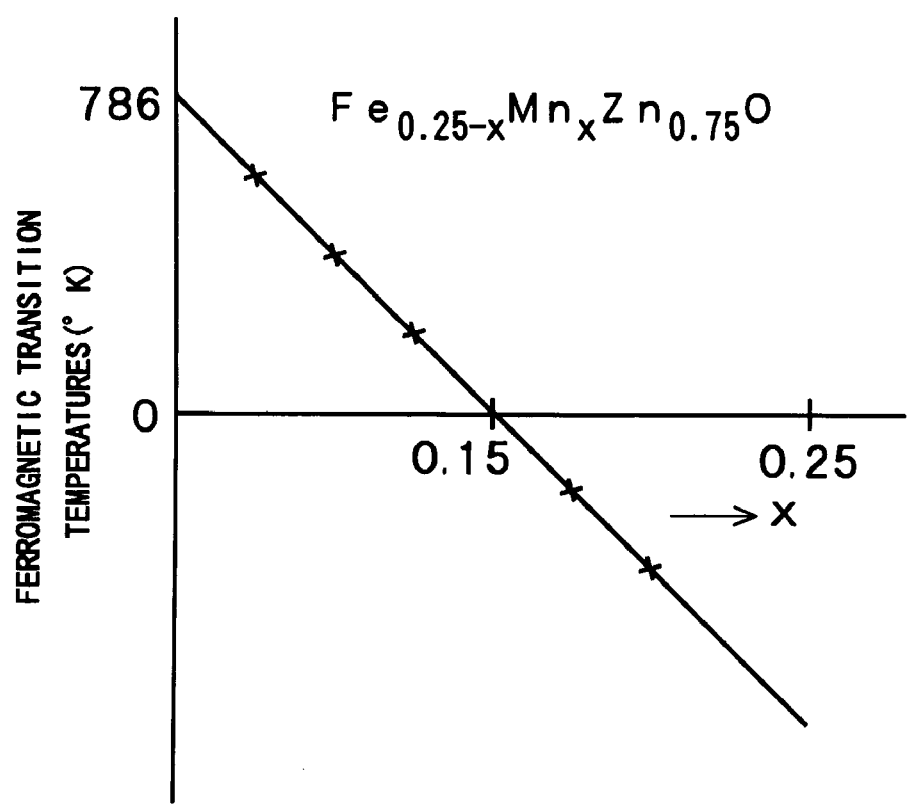
FIGS. 4(a) and 4(b) are diagrams illustrating variations in ferromagnetic transition temperatures depending on ratios of crystal-mixing more than two types of transition elements.
Figure 4:
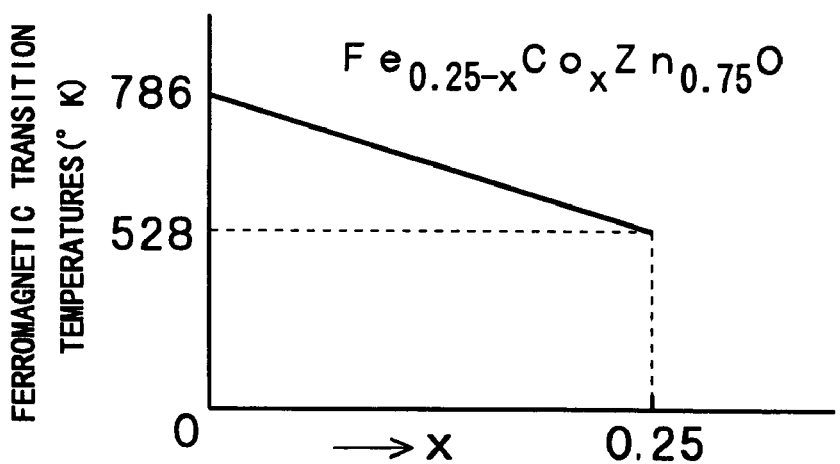

The inventors of the present invention have further found out that it is possible to adjust conditions of holes or electrons and to concurrently exhibit respective magnetic characteristics by crystal-mixing two or more types of transition metallic elements. For example, Fe and Mn were crystal-mixed to be 25 at % as a whole and values x of $Fe_{0.25-x}Mn_xZn_{0.75}O$ were respectively varied. It was consequently possible to largely vary the ferromagnetic transition temperature, to be 0 degree K when x=0.15 is satisfied, and to select a range for x between 0 to 0.15 for setting a desired ferromagnetic transition temperature as illustrated in FIG. 4(a). By similarly crystal-mixing Fe and Co to be 25 at % and respectively varying values x of $Fe_{0.25-x}Co_xZn_{0.75}O$, ferromagnetic transition temperatures may be varied while maintaining a ferromagnetic state as illustrated in FIG. 4(b). Though not shown in the drawings, it is also possible to obtain magnetic moments in accordance with respective mixing ratios.

While ferromagnetic characteristics were varied by doping not less than two types of transition metallic elements in the above examples, the amount of holes or electrons may similarly be varied by doping an n-type dopant or a p-type dopant for varying the ferromagnetic states. In this case, the n-type or p-type dopant will enter a conduction band or a valence band of ZnO to act on adjoining d-electrons of transition metallic elements such that not all of the doped dopants will act as a whole, the action on the d-electrons will also cause variations in ferromagnetic states and also vary ferromagnetic transition temperatures. Doping, for instance, an n-type dopant also means supply of electrons so that doping an n-type dopant while crystal-mixing Fe will cause the same effects as adding Co further to Fe, and that doping a p-type dopant to Fe will cause the same effects as adding Mn to Fe.

Figure 5:
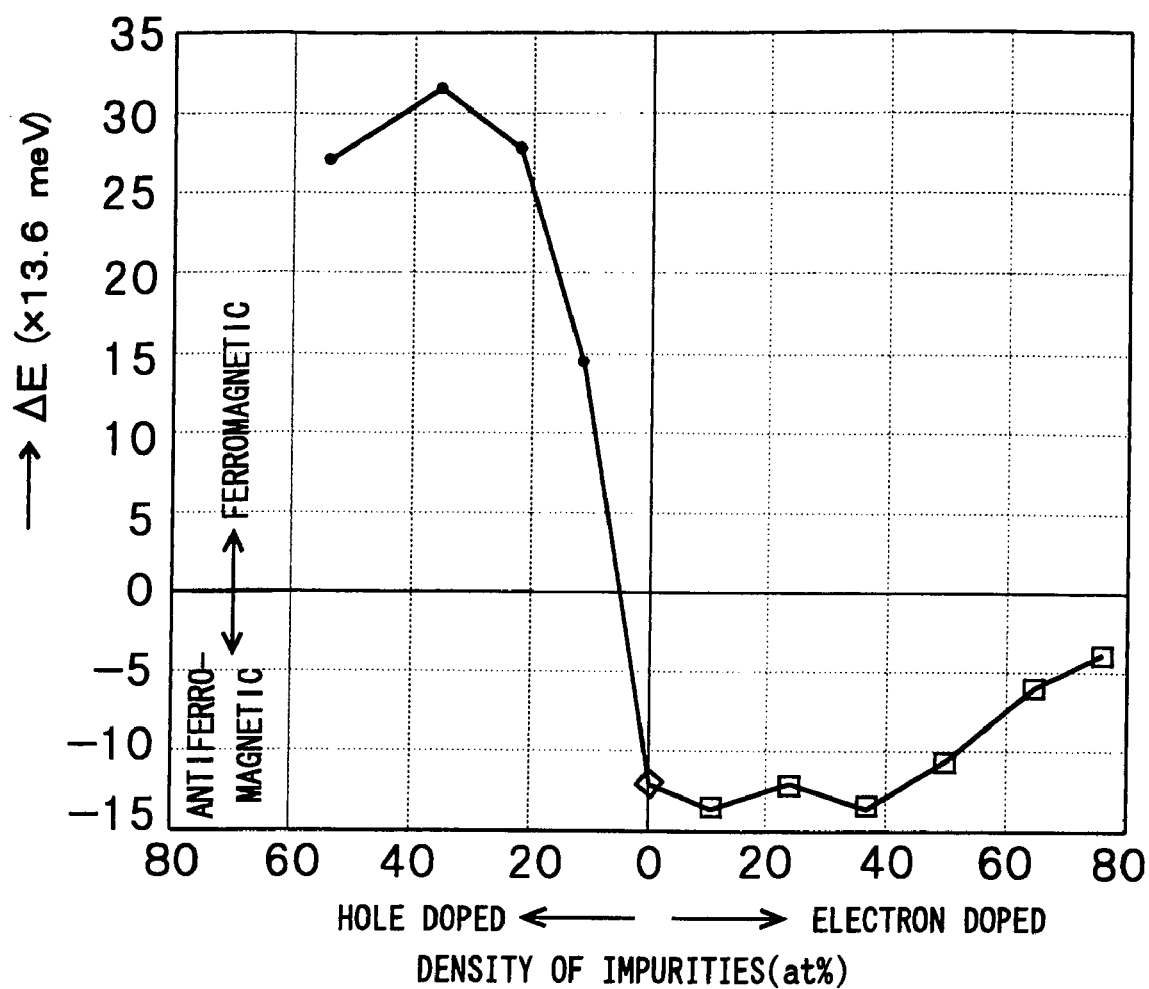
FIG. 5 is an explanatory view showing variations in magnetic states when an n-type or p-type dopant is added to, for instance, Mn.

A relationship of $\Delta E$ of Mn to a density of impurities (at %), in which Mn, which variations in $\Delta E$ obtained by subtracting ferromagnetic energy from antiferromagnetic energy according to doping the n-type or p-type dopant (electrons or holes) are remarkable, is crystal-mixed to ZnO and is further doped with the impurities (holes or electrons) is illustrated in FIG. 5. By introducing holes at a ratio of not less than approximately 10%, the antiferromagnetic state will be converted to a ferromagnetic state, the ferromagnetic characteristics will be varied in accordance with densities thereof, and to adjust the ferromagnetic characteristics thereof. Other transition metallic elements originally exhibit ferromagnetism so that no large differences exist between antiferromagnetism and ferromagnetism, but the ferromagnetic states may be similarly varied and the ferromagnetic transition temperatures may by adjusted. It should be noted that unlike the above adjustments performed by crystal-mixing not less than two types of transition metallic elements, magnetic moments themselves will maintain constant values adjustments depending on transition elements materials that are crystal-mixed to ZnO in case of performing adjustments using dopants.

The n-type dopant may be B, Al, In, Ga, Zn or H, and raw materials for the doping may also be oxides of the above. The donor density is preferable not less than $1 \times 10^{18}$ cm$^{-3}$. In case doping is performed in a density of approximately $10^{20}$ to $10^{21}$ cm$^{-3}$, it will correspond to a crystal-mixing ratio of approximately 1 to 10%. The p-type dopant may be atomic like N, as explained above, such as N$^+$ or N$_2$ in an excited state. While it is hard to perform doping using a p-type dopant, the p-type density may set to be large by simultaneously doping a slight amount of n-dopant.

Upon performing further studies, the inventors have found out that minimum transmitted wavelengths differ depending on transition elementlic materials to be crystal-mixed to ZnO, that the minimum wavelength of transmitted light is adjustable by mixing not less than two types of transition metallic elements to be crystal-mixed, and that light filter for cutting light having a wavelength that is not more than a desired one may be formed. In other words, a ferromagnetic ZnO-type compound that transmits light of a desired wavelength may be obtained. The minimum wavelengths of light to be transmitted when crystal-mixing 25 at % of the respective transition elementlic elements to ZnO are as illustrated in the Table 3 below.

TABLE 3

Minimum wavelengths of light to be transmitted when crystal-mixing transition elements

| Type of transition element | Density of transition element (at %) | Minimum wavelength (nm) |
| --- | --- | --- |
| ZnO:V | 25 | 375 |
| ZnO:Cr | 25 | 426 |
| ZnO:Fe | 25 | 412 |
| ZnO:Co | 25 | 415 |

TABLE 3-continued

Minimum wavelengths of light to be transmitted when crystal-mixing transition elements

| Type of transition element | Density of transition element (at %) | Minimum wavelength (nm) |
| --- | --- | --- |
| ZnO:Ni | 25 | 390 |
| ZnO:Mn | 25 | 485 |

In other words, according to this example, it is possible to obtain a ferromagnetic magnet that transparent to light of a desired wavelength.

As explained so far, the entire energy may be varied in the present invention owing to kinetic energy of holes or electrons introduced by metallic elements themselves that are crystal-mixed, and since the holes or electrons that are introduced are adjusted to decrease the entire energy, the ferromagnetic state may be stabilized. The size and sign of magnetic interaction between metallic atoms are varied by introducing holes or electrons, and by controlling these through the holes and electrons, the ferromagnetic state may be stabilized.

While a MBE (molecular beam epitaxy) apparatus is used for performing the method of forming a thin film of ZnO-type compound containing therein transition metallic elements in the above example, it is similarly possible to perform film forming by using a MOCVD (metal organic chemical vapor deposition) apparatus. In this case, metallic materials such as Zn or transition element are introduced into the MOCVD apparatus in a form of an organic metallic compound such as dimethyl zinc. By using such MBE or MOCVD methods, it is possible to perform film forming in a non-equilibrium state and to dope transition metallic elements at desired densities. The film forming methods for the thin films are not limited to the above methods, and it is alternatively possible to form thin films through a laser abrasion method in which Zn oxide solid bodies, transition metallic element metals or solid bodies of oxides are used as targets and wherein film forming is performed while irradiating activated oxygen on the substrate.

In case of performing doping using transition metallic elements or oxides thereof as raw materials, it is also possible to use ECR plasma in which atomic states are assumed through electron excitation using radio frequency waves, laser, X rays or electron beams. ECR plasma may also be employed when using an n-type or p-type dopant. Such ECR dopant is advantaged in that doping may be performed in a atomic state up to a high density.

According to the present invention, a ferromagnetic single crystal structure may be obtained by simply making the ZnO-type compound contain transition metallic elements, application to high-performance communication of information and quantum computers is enabled for use in quantum computers and large-capacity optical magnetic memory and as optical electronics materials covering a scope ranging from visible-light to ultraviolet regions by combining these with ZnO that are already realized and used as n-type and p-type transparent electrodes, or with optical fibers.

Although preferred example have been described in some detail it is to be understood that certain changes can be made by those skilled in the art without departing from the spirit and scope of the invention as defined by the appended claims.

What is claimed is:

1. A ferromagnetic ZnO-type compound film having a single crystal structure, wherein a ZnO-type compound contains at least one metal selected from the group consisting of V, Cr, Fe, Co, Ni, Rh and Ru, each of which is alloyed with the ZnO-type compound.

2. The ferromagnetic ZnO-type compound film of claim 1, wherein said ZnO-type compound contains at least two types of metals selected from the group consisting of V, Cr, Fe, Co, Ni, Rh and Ru, and the group consisting of Ti, Mn, and Cu, wherein at least one metal is selected from each group.

3. The ferromagnetic ZnO-type compound of claim 1, wherein said ZnO-type compound further contains at least one of an n-type dopant and a p-type dopant.

4. The ferromagnetic ZnO-type compound film of claim 1, wherein said ZnO-type compound comprises $Fe_xMn_yZn_{1-x-y}O$ (x is 0.01–0.99, y is 0.01–0.99).

5. The ferromagnetic ZnO-type compound film of claim 1, wherein the ZnO-type compound comprises $Fe_xCo_yZn_{1-x-y}O$ (x is 0.01–0.99, y is 0.01–0.99).

* * * * *